(12) United States Patent
Qi et al.

(10) Patent No.: US 7,991,340 B2
(45) Date of Patent: Aug. 2, 2011

(54) FUSER MEMBER

(75) Inventors: Yu Qi, Oakville (CA); Qi Zhang, Mississauga (CA); Nan-Xing Hu, Oakville (CA); Gordon Sisler, St. Catharines (CA); Guiqin Song, Milton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/639,302

(22) Filed: Dec. 16, 2009

(65) Prior Publication Data

US 2011/0142508 A1    Jun. 16, 2011

(51) Int. Cl.
*G03G 15/20* (2006.01)
(52) U.S. Cl. ........... 399/333; 399/122; 399/331; 492/53
(58) Field of Classification Search .................. 399/122, 399/320, 328–331, 333; 492/46, 49, 53–54; 219/216, 220; 313/15
See application file for complete search history.

(56) References Cited

U.S. PATENT DOCUMENTS

| 4,770,927 | A | | 9/1988 | Effenberger et al. | |
|---|---|---|---|---|---|
| 5,230,937 | A | | 7/1993 | Effenberger et al. | |
| 6,099,960 | A | * | 8/2000 | Tennent et al. | 428/367 |
| 7,105,428 | B2 | * | 9/2006 | Pan et al. | 438/584 |
| 2004/0262581 | A1 | * | 12/2004 | Rodrigues | 252/500 |
| 2006/0175952 | A1 | * | 8/2006 | Lee et al. | 313/311 |
| 2006/0292360 | A1 | * | 12/2006 | Hays et al. | 428/323 |
| 2007/0084797 | A1 | * | 4/2007 | Cooper et al. | 210/660 |
| 2007/0120095 | A1 | * | 5/2007 | Gruner | 252/500 |

OTHER PUBLICATIONS

"Cleanliness Measurements Using Contact Angles", First Ten Angstroms, Aug. 14, 2000.*

* cited by examiner

*Primary Examiner* — David Porta
*Assistant Examiner* — Benjamin Schmitt
(74) *Attorney, Agent, or Firm* — Hoffman Warnick LLC

(57) ABSTRACT

The present teachings provide a fuser member, including a substrate and a release layer disposed on the substrate. The release layer includes a plurality of carbon nanotubes surrounded by a fluoroelastomeric shell layer and dispersed in a fluoroplastic.

20 Claims, 2 Drawing Sheets

FUSER MEMBER

BACKGROUND

1. Field of Use

This disclosure is generally directed to fuser members useful in electrophotographic imaging apparatuses, including digital, image on image, and the like.

2. Background

In a typical electrophotographic imaging apparatus, an image of an original to be copied, or the electronic document image, is recorded in the form of an electrostatic latent image upon a photosensitive member and the latent image is subsequently rendered visible by the application of thermoplastic resin particles or composites thereof which are commonly referred to as toner. The visible toner image is in a loose powdered form and can be easily disturbed or destroyed. The toner image is usually fixed or fused upon a substrate or support member which may be a cut sheet or continuous media, such as plain paper.

The use of thermal energy for fixing toner images onto a support member is well known. In order to fuse toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser member, and accordingly it is desired to provide a fusing surface, which has low surface energy to provide the necessary release.

A fuser or image fixing member, which can be a rolls or a belt, may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

Current fuser members may be composed of a resilient silicone layer with a fluoropolymer topcoat as the release layer. Fluoropolymers can withstand high temperature) (>200° and pressure conditions and exhibit chemical stability and low surface energy, i.e. release properties. There are typically two types of fuser topcoat materials used for the current fuser member—fluoroelastomers and fluoroplastics. Fluoroelastomers have good mechanical flexibility, provide shock absorbing properties and typically require a release agent to prevent offset due to their higher surface energy. Fluoroplastics, such as TEFLON® also from E.I. DuPont de Nemours, Inc. have a lower surface energy due to high fluorine content and are widely used for oil-less fusing. However, fluoroplastics typically lack mechanical flexibility, which can cause, for example, denting, cracking, and abrasion.

SUMMARY

According to various embodiments, a fuser member, including a substrate and a release layer disposed on the substrate, is provided. The release layer includes a plurality of carbon nanotubes surrounded by a fluoroelastomeric shell layer and dispersed in a fluoroplastic.

According to another embodiment, there is described a method of making a fuser member. The method includes obtaining a substrate and coating a coating composition of carbon nanotubes having a fluoroelastomer shell layer, a fluoroplastic, a curing agent and an organic solvent on the substrate. The coating composition is cured to form a release layer.

According to another embodiment, there is described an image rendering device which includes an image applying component for applying an image to a copy substrate and a fusing apparatus, which receives the copy substrate with the applied image from the image applying component and fixes the applied image more permanently to the copy substrate. The fusing apparatus includes a fusing member and a pressure member which define a nip therebetween for receiving the copy substrate therethrough. The fuser member includes a substrate and an outer layer disposed on the substrate release layer disposed on the substrate which includes a plurality of carbon nanotubes surrounded by a fluoroelastomer shell layer dispersed in a fluoroplastic.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
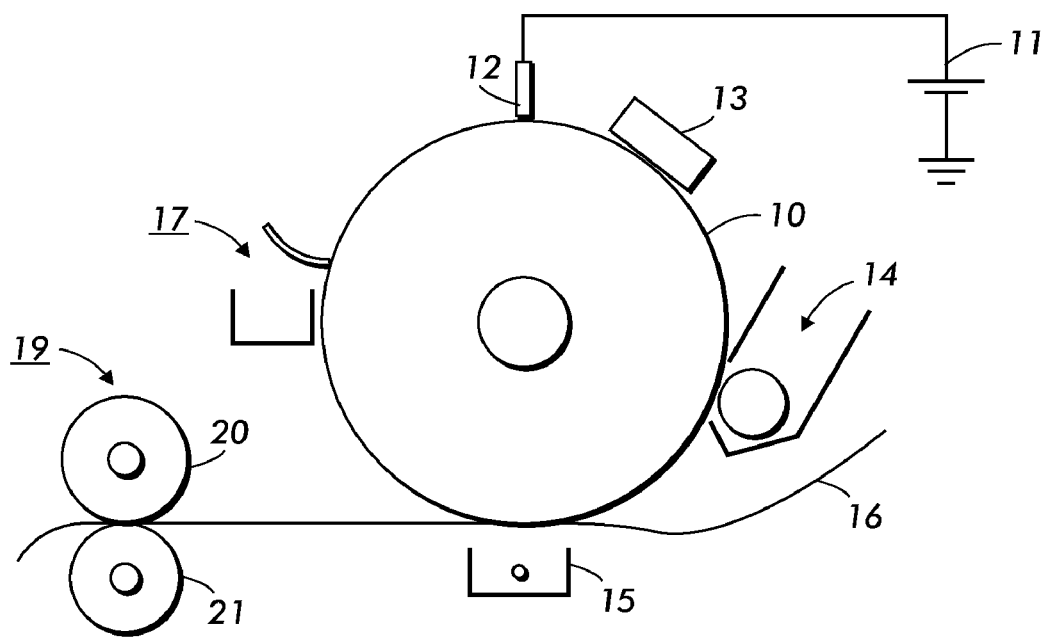
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12, to which a voltage has been supplied from a power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roll 20 and a pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Subsequent to transfer, photoreceptor 10 advances to a cleaning station 17, wherein any toner left on photoreceptor 10 is cleaned therefrom by use of a blade (as shown in FIG. 1), brush, or other cleaning apparatus.

Figure 2:
FIG. 2 is a schematic of an embodiment of a fuser member.

FIG. 2 is an enlarged schematic view of an embodiment of a fuser member, demonstrating the various possible layers. As shown in FIG. 2, a substrate 25 has an intermediate layer 22 thereon. Intermediate layer 22 can be, for example, a silicone rubber. On intermediate layer 22 is positioned a release layer 24, described in more detail below.

Figure 3:
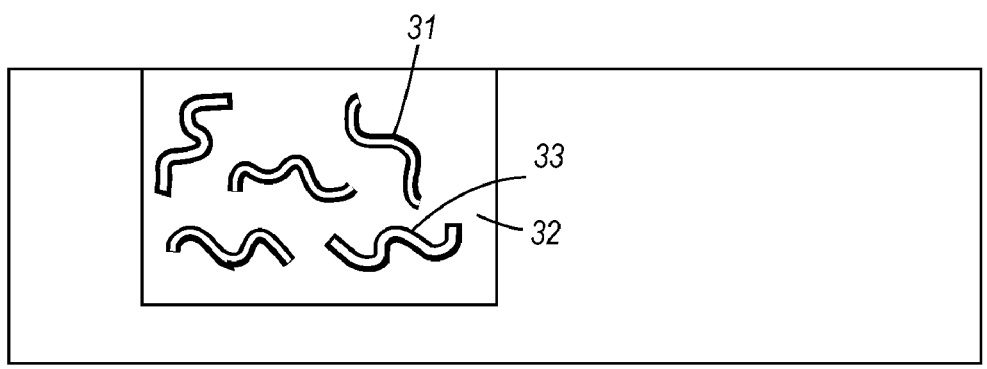
FIG. 3 is a detailed diagram of a release layer.

Shown in FIG. 3 is a release layer. The release layer includes a composite material of carbon nanotubes (CNTs) 32 coated with a fluoroelastomer shell layer 31 dispersed in a fluoroplastic 33. Such a release layer provides a layer that is less brittle and less susceptible to dents or cracks while providing a low surface energy for good toner release. The CNTs 32 provide a hard core and the fluoroelastomer provides a soft shell layer 31. The fluoroelastomer coated CNTs toughen the fluoroplastic 33. The release layer can have a surface free energy of about 25 mN/m or less, wherein the surface free energy can be calculated, e.g., by using Lewis Acid-Base method from the results of the contact angle measurement using Fibro DAT1100 instrument.

Fluoroplastics suitable for use in the formulation described herein include fluoropolymers comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoroplastic provides chemical and thermal stability and has a low surface energy. The fluoroplastic has a melting temperature of from about 100° C. to about 350° C. or from about 120° C. to about 330° C.

As used herein and unless otherwise specified, the term "carbon nanotube" or CNT refers to an elongated carbon material that has at least one minor dimension (for example, width or diameter of up to 100 nanometers). In various embodiments, the CNT can have an average diameter ranging from about 1 nm to about 100 nm, or in some cases, from about 5 nm to about 50 nm, or from about 10 nm to about 30 nm. The carbon nanotubes have an aspect ratio of at least 10, or from about 10 to about 1000, or from about 10 to about 5000. The aspect ratio is defined as the length to diameter ratio.

In various embodiments, the carbon nanotubes can include, but are not limited to, carbon nanoshafts, carbon nanopillars, carbon nanowires, carbon nanorods, and carbon nanoneedles and their various functionalized and derivatized fibril forms, which include carbon nanofibers with exemplary forms of thread, yarn, fabrics, etc. In one embodiment, the CNTs can be considered as one atom thick layers of graphite, called graphene sheets, rolled up into nanometer-sized cylinders, tubes, or other shapes.

In various embodiments, the carbon nanotubes or CNTs can include modified carbon nanotubes from all possible carbon nanotubes described above and their combinations. The modification of the carbon nanotubes can include a physical and/or a chemical modification.

In various embodiments, the carbon nanotubes or CNTs can include single wall carbon nanotubes (SWCNTs), multi-wall carbon nanotubes (MWCNTs), and their various functionalized and derivatized fibril forms such as carbon nanofibers.

The CNTs can be formed of conductive or semi-conductive materials. In some embodiments, the CNTs can be obtained in low and/or high purity dried paper forms or can be purchased in various solutions. In other embodiments, the CNTs can be available in the as-processed unpurified condition, where a purification process can be subsequently carried out.

One of ordinary skill in the art would understand that the CNT core element of the core-fluoroelastomer shell layer can have various other cross sectional shapes, regular or irregular, such as, for example, a rectangular, a polygonal, or an oval shape. Accordingly, the CNT 32 can have, for example, cylindrical 3-dimensional shapes.

The carbon nanotubes coated with a fluoroelastomer shell are present in an amount of from about 0.1 percent to about 20 percent based on a weight of the release layer. A further example is from about 0.5 percent to about 15 percent, or from about 1 percent to about 10 percent weight percent based weight of the release layer.

The fluoroelastomer shell layer includes a polymer selected from the group consisting of fluoroelastomer, a perfluoroelastomer, perfluoropolyether, a silicone, a fluorosilicone, and mixtures thereof.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Commercially available fluoroelastomers used for the shell layer 31 in FIG. 3 can include, such as, for example, VITON® A (copolymers of hexafluoropropylene (HFP) and vinylidene fluoride (VDF or VF2)), VITON® B, (terpolymers of tetrafluoroethylene (TFE), vinylidene fluoride (VDF) and hexafluoropropylene (HFP)), and VITON® GF, (tetrapolymers of TFE, VF2, HFP), as well as VITON® E, VITON® E 60C, VITON® E430, VITON® 910, VITON® GH and VITON® GF. The VITON® designations are trademarks of E.I. DuPont de Nemours, Inc. (Wilmington, Del.).

In a specific embodiment, the fluoroelastomers for the shell layer 31 can include VITON-GF® (E.I. du Pont de Nemours, Inc.), including TFE, HFP, and VF2, and a cure site. Exemplary curing agent for this elastomer can include VITON® Curative No. 50 (VC-50) available from E.I. du Pont de Nemours, Inc. Curative VC-50 can contain Bisphenol-AF as a cross-linker and diphenylbenzylphosphonium chloride as an accelerator.

In various embodiments, the fluoroelastomer shell layer 31 can be attached to the CNT 31 by physical or chemical bonds through, for example, a functional group of the elastomers that is capable of bonding with the carbon nanotubes. In an exemplary embodiment, the fluorelastomeric materials used for the shell layer 31 can have a chemically functional group capable of reacting with CNT or modified CNT by a covalent bond so as to form a shell layer 31 surrounding the CNT 32. The functional group can include, but is not limited to, hydroxyl, carboxylic acid, aziridine, azomethine ylide, aryl diazonium cation, oxazolidinone, and mixtures thereof.

In various embodiments, the shell layer 31 can have a shell thickness $T_s$ on the outer surface of the CNT hard core 32. In various embodiments, the shell thickness $T_s$ can be at least about 1 nm. In embodiments, the shell thickness $T_s$ can be in a range from about 1 nm to about 5 nm, or in some cases, from about 1 nm to about 1000 nm.

In various embodiments, the fluoroelastomers used for the shell layer 31 can be present in an amount of from about 1% to 50% by weight of the fluoroplastic 33. In an additional example, the fluoroelastomers used for the shell layer 31 can be present in an amount of from about 2% to about 20% by weight of the fluoroplastic 33, or in some cases from about 2% to about 10% by weight of the fluoroplastic 33. Other possible amount of fluoroelastomers can also be included in the present teachings.

In various embodiments, other filler materials, for example inorganic particles, can be used for the coating composition and the subsequently formed release layer. In various embodiments, exemplary inorganic particles can include metal oxides, non-metal oxides, and metals. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, and indium tin oxide. The non-metal oxides can include, for example, boron nitride and silicon carbides (SiC). The metals can include, for example, nickel, copper, silver, gold, zinc, and iron. In various embodiments, other additives known to one of ordinary skill in the art can also be included to form the disclosed composite materials.

The thickness of the release layer of the fuser member is from about 10 to about 250 micrometers, or from about 15 to about 100 micrometers, or from about 20 to about 50 micrometers.

The surface resitivity of the release comprises a surface resistivity is $10^8$ Ω/sq or less.

Various embodiments can also include a method for making the release layer in accordance with the present teachings. It will be appreciated that the present invention is not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings.

The coating composition can also be prepared to include, for example, an effective solvent, in order to disperse the fluoroelastomer coated carbon nanotubes, fluoroplastic, and optionally, inorganic filler particles that are known to one of ordinary skill in the art.

The effective solvents can include water and/or organic solvents including, but not limited to, methyl isobutyl ketone (MIBK), acetone, methyl ethyl ketone (MEK), and mixtures thereof. Other solvents that can form suitable dispersions can be within the scope of the embodiments herein.

In various embodiments, the coating composition can be coated using, for example, coating techniques, extrusion techniques and/or molding techniques. As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed.

The coating composition for the release layer is prepared by shear-mixing fluoroelastomer-coated CNT with a type of fluoroplastic, for example, THVP210 from Dyneon. The resulting coating dispersion is prepared by mixing the coating composition with a curing agent (e.g. VC 50/metal oxide or AO700) in an organic solvent (e.g. MIBK). The fuser topcoat is fabricated by coating the dispersion on the fuser substrate and thermally curing the coating at elevated temperatures, for example, from about 150° C. stepwise increased to about 177° C., about 204° C. and to about 230° C. Compared with a fluoroplastic control having no fluoroelastomer coated carbon nanotubes, the fluoroelastomer coated CNTs dispersed in fluoroplastic composite show a significant increase in mechanical toughness while the surface free energy is not altered.

The substrate 25 in FIG. 2 can be in a form of, for example, a belt, plate, and/or cylindrical drum for the disclosed fuser member. The substrate of the fusing member is not limited, as long as it can provide high strength and physical properties that do not degrade at a fusing temperature. Specifically, the substrate can be made from a metal, such as aluminum or stainless steel or a plastic of a heat-resistant resin. Examples of the heat-resistant resin include with high strength include a polyimide, an aromatic polyimide, polyether imide, polyphthalamide, polyester, and a liquid crystal material such as a thermotropic liquid crystal polymer and the like. The thickness of the substrate falls within a range where rigidity and flexibility enabling the fusing belt to be repeatedly turned can be compatibly established, for instance, ranging from about 10 to about 200 micrometers or from about 30 to about 100 micrometers.

The intermediate layer 22 can include, for example, a rubber layer. The resilient layer provides elasticity and can include a silicone rubber as a main component and be mixed with inorganic particles, for example SiC or $Al_2O_3$, as required.

Examples of suitable intermediate layers include silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning.

The thickness of the intermediate layer is from about 0.5 to about 20 mm, or from about 1 to about 7 mm.

EXAMPLE 1

Preparation of a THVP/2% CNT/Viton Composite Coating

About 12 parts of multi-walled carbon nanotubes and 88 parts of Viton GF (available from E.I. du Pont de Nemours, Inc.) were placed in a Haake Rheomix mixer (from Thermo Scientific), and compounded at a rotor speed of 20 rpm for 30 minutes to form nanotube masterbatch containing 12 weight percent of carbon nanotubes dispersed and coated in Viton GF. 13 parts of the resulting carbon nanotube Viton GF masterbatch were then compounded with 67 grams of THVP221 (a fluoroplastic available from Dyneon) at about 80° C. in a Haake Rheomix at a rotor speed of 20 rpm for 30 minutes to form a composition containing about 2 weight percent of carbon nanotubes covering a Viton GF elastomer shell.

The THVP/CNT/Viton composition (4.18 Parts) was mixed with the metal oxides (0.787 part of magnesium oxide and 0.393 part of calcium hydroxide), and 1.68 parts of the bisphenol VC-50 curing agent (Viton® Curative No. 50 available from E.I. du Pont de Nemours, Inc.) in methyl isobutyl ketone (28.4 parts). The resulting coating composition was then cast in a mold. The resulting film after solvent evaporation was cured at ramp temperatures of about 149° C. for 2 hours, about 177° C. for 2 hours, about 204° C. for 2 hours and at about 232° C. for 6 hours. The cured film was subjected to mechanical testing. The mechanical testing was performed using ASTM D412 Tensile Properties of Elastomers. The results are summarized in table 1.

EXAMPLE 2

Preparation of a THVP/3% CNT/Viton Composite Coating

A polymer composite coating containing about 3 weight percent of carbon nanotubes covering a Viton elastomer shell was prepared following the procedure described in Example 1, except that 20 grams of CNT masterbatch and 60 grams of THVP221 were used to make the THVP/3% CNT/Viton composite materials. The THVP/3% CNT/Viton composition (4.225 Parts) was mixed with the metal oxides (0.787 part of magnesium oxide and 0.393 part of calcium hydroxide), and 1.9 parts of the bisphenol VC-50 curing agent (Viton® Curative No. 50 available from E.I. du Pont de Nemours, Inc.) in methyl isobutyl ketone (28.5 parts). The resulting composition was then cast in a mold. The resulting film after solvent evaporation was cured at ramp temperatures of from about 149° C. for 2 hours, about 177° C. for 2 hours, about 204° C. for 2 hours and at about 232° C. for 6 hours. The results are summarized in table 1.

COMPARATIVE EXAMPLE 1

Preparation of a THVP Coating

The THVP coating was prepared by mixing the THVP221 (4.10 parts), metal oxides (0.787 part of magnesium oxide and 0.393 part of calcium hydroxide), and 1.68 parts of the bisphenol VC-50 curing agent (Viton® Curative No. 50 available from E.I. du Pont de Nemours, Inc.) in methyl isobutyl ketone (27.5 parts). The resulting coating composition was then cast in a mold. The resulting film after solvent evaporation was cured at ramp temperatures of from about 149° C. for 2 hours, about 177° C. for 2 hours, about 204° C. for 2 hours and at about 232° C. for 6 hours. The results are summarized in Table 1.

COMPARATIVE EXAMPLE 2

Preparation of a THVP/Viton Composite Coating

THVP/Viton composite coating was prepared following the procedure described in Example 1, except that 68 grams of THVP221 and 12 grams of Viton GF pellets GF (available from E.I. du Pont de Nemours, Inc.) were used to produce the coating composition. The coating film was cast following the procedure described in comparative Example 1.

TABLE 1

| Examples | Film Thickness (mil) | Tensile stress (Psi) | Tensile strain (%) | Modulus (Young's) (Psi) | Toughness |
|---|---|---|---|---|---|
| Example-1 | 13.7 | 955.6 | 142.1 | 1740.1 | 806.3 |
| Example-2 | 17.6 | 1223.8 | 158.5 | 4397.5 | 1283.0 |
| Comparative Example -1 | 14.8 | 327.7 | 136.9 | 928.7 | 332.7 |
| Comparative Example-2 | 13.2 | 499.2 | 163.2 | 1044.6 | 546.5 |

Fluoroplastic materials are known to provide required releasing properties for fusing. However, they are semi-crystalline materials, and are prone to ductile failure due to their inherent brittleness. One strategy to improve the mechanical performance of semi-crystalline polymers is achieved by adding rubber fillers. Although fracture toughness can be significantly improved, the rubber-toughened polymers typically result in dramatic drop in modulus. As shown in Table 1 the use of fluoroelastomer coated CNTs in a fluoroplastic coating provides superior tensile strain, toughness, tensile stress and Young's Modulus over a fluoroplastic coating without fluoroelastomer coated CNTs. Thus, a superior release layer for fuser members is provided.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. A fuser member, comprising
   a substrate, and
   a release layer disposed on the substrate comprising a plurality of core-shell particles comprising carbon nanotubes surrounded by a fluoroelastomer shell layer wherein the plurality of core-shell particles are dispersed in a fluoroplastic.

2. The fuser member of claim 1, wherein the fluoroplastic comprises one or more monomeric repeat units selected from the group consisting of tetrafluoroethylene, vinylidene fluoride, hexafluoropropylene, chlorotrifluoroethylene, perfluoro(methyl vinyl ether), perfluoro(ethyl vinyl ether) and perfluoro(propyl vinyl ether).

3. The fuser member of claim 1, wherein the fluoroplastic is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

4. The fuser member of claim 1, wherein the fluoroelastomer shell layer has a thickness of from about 1 nanometer to about 1000 nanometers.

5. The fuser member of claim 1, wherein the fluoroelastomer shell layer comprises a polymer selected from the group consisting of fluoroelastomer, a perfluoroelastomer, perfluoropolyether, a silicone and a fluorosilicone.

6. The fuser member of claim 1, wherein the fluoroelastomer shell layer further comprises a cross-linker.

7. The fuser member of claim 1, wherein the fluoroelastomer shell layer further comprises a functional group capable of bonding with a carbon nanotube.

8. The fuser member of claim 7, wherein the functional group capable of bonding with the carbon nanotube is selected from the group consisting of a hydroxyl, a carboxylic acid, an aziridine, an azomethine ylide, an azide, an aryl diazonium cation, an oxazolidinone, and mixtures thereof.

9. The fuser member of claim 1, wherein the carbon nanotubes comprise an aspect ratio ranging from about 10 to about 5000.

10. The fuser member of claim 1, wherein the carbon nanotubes comprise a single wall carbon nanotube (SWCNT) or a multi-wall carbon nanotube (MWCNT).

11. The fuser member of claim 1, wherein the plurality of core-shell particles is present in an amount of about 0.5 percent to about 20 percent based on a weight of the release layer.

12. The fuser member of claim 1, wherein the release layer further comprises filler materials selected from the group consisting of metal oxides, non-metal oxides and metals.

13. The fuser member of claim 1, wherein the release layer comprises a thickness of from about 10 to about 250 micrometers.

14. The fuser member of claim 1, wherein the release layer has a surface energy of 25 mN/m or less.

15. The fuser member of claim 1, wherein the release layer comprises a surface resistivity of $10^8$ Ω/sq or less.

16. The fuser member of claim 1, further comprising an intermediate layer disposed between the substrate and the release layer.

17. The fuser member of claim 16, wherein the intermediate layer comprises a silicone material.

18. A method of making a fuser member for fixing a developed image to a copy substrate, comprising:
   obtaining a substrate;
   coating a coating composition of a plurality of carbon nanotubes with a fluoroelastomer shell layer, a fluoroplastic, a curing agent and an organic solvent on the substrate; and
   curing coating composition to form a release layer.

19. The method of claim 18, wherein the organic solvent is selected from the group consisting of methyl isobutyl ketone (MIBK), acetone and methyl ethyl ketone (MEK).

20. An image forming apparatus for forming images on a recording medium comprising a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a fuser member for fusing toner images to a surface of the copy substrate, wherein said fuser member comprises a substrate, and thereover, an outer layer comprising a plurality of core-shell particles comprising carbon nanotubes surrounded by a fluoroelastomer shell layer wherein the plurality of core-shell particles are dispersed in a fluoroplastic, wherein the outer layer has surface free energy of 25 mN/m or less.

* * * * *